Sept. 2, 1958　　B. H. HAMILTON　　2,850,694

CURRENT SUPPLY APPARATUS FOR LOAD VOLTAGE REGULATION

Filed July 7, 1954

INVENTOR
B. H. HAMILTON
BY
G. F. Heuerman
ATTORNEY 2,850,694

CURRENT SUPPLY APPARATUS FOR LOAD VOLTAGE REGULATION

Billy H. Hamilton, Orange, N. J., assignor to Bell Telephone Laboratories, Incorporated, New York, N. Y., a corporation of New York Application July 7, 1954, Serial No. 441,871

3 Claims. (Cl. 323—22)

Figure 1:
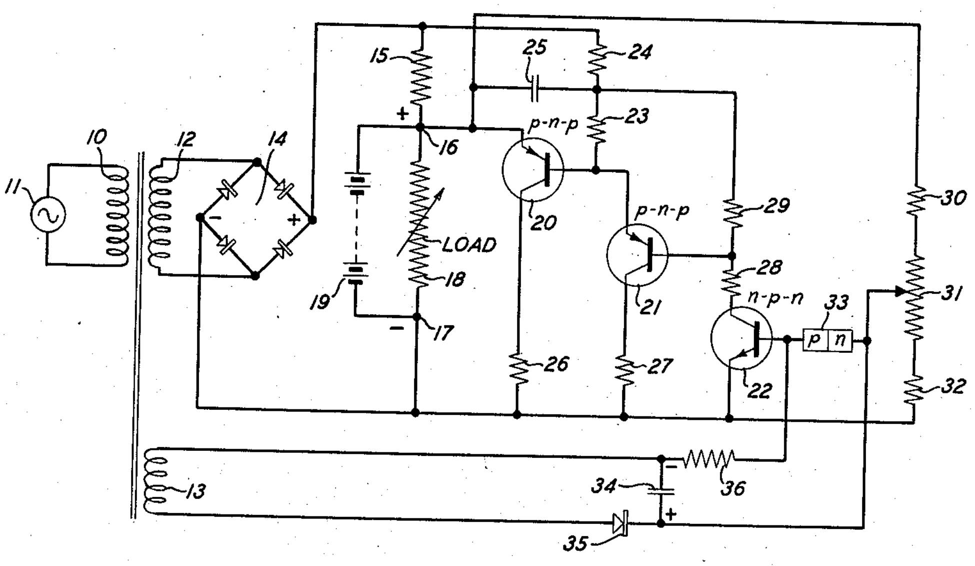

This invention relates to current supply apparatus and more particularly to apparatus for controlling the supply of current from a current source to a load to minimize changes of load voltage.

An object of the invention is to provide an improved current supply circuit including a transistor or transistors to set up across a load a substantially constant voltage having a desired magnitude.

Another object of the invention is to provide a current supply circuit comprising one or more transistors for maintaining a substantially constant load voltage over a predetermined range of load current and over a wide range of ambient temperatures.

This invention is an improvement over the invention disclosed and claimed in an application of F. H. Chase, Serial No. 385,570, filed October 12, 1953, now Patent No. 2,751,550, June 19, 1956.

In accordance with the invention, means having resistance is provided for supplying direct current to a load. There is connected across the load a shunt current path comprising the emitter and collector of a transistor. For the purpose of minimizing load voltage changes over a predetermined range of load current and over a wide range of ambient temperatures, means are provided for controlling the amplitude and the direction of the base current of the transistor.

In a specific embodiment of the invention, herein shown and described for the purpose of illustration, direct current is supplied from a rectifier through a series resistor to a load circuit comprising a dissipative load across which a floating storage battery may be connected. A shunt current path connected across the load comprises the emitter and collector of a first transistor which may be of the p-n-p type, for example. There is provided a transistor detector-amplifier comprising a second and a third transistor responsive to load voltage changes for controlling the base current of the first transistor and thereby the current flowing in the shunt current path across the load. The second and third transistors may be of the p-n-p and n-p-n types, respectively, for example. There are provided a current path connecting the base of the first transistor and the emitter of the second transistor and a current path connecting the base of the second transistor and the collector of the third transistor. Current is supplied from the rectifier through a first resistive path into the emitter and out of the collector of the second transistor. Current is also supplied from the rectifier through a second resistive path into the collector and out of the emitter of the third transistor. A voltage dividing resistance path is connected across the load. Current is supplied from an auxiliary rectifier through a resistor to a p-n junction diode to set up a substantially constant reference voltage across the diode. The p-n junction diode and an adjustable portion of the voltage divider are connected in series in a circuit connecting the base and the emitter of the third transistor.

A decrease of load voltage due to an increase of load current, for example, will make the potential of the base of the third transistor relatively less positive or more negative with respect to its emitter potential. As a result, the currents flowing into the collector of the third transistor, into the emitter of the second transistor and into the emitter of the first transistor, respectively, will each decrease. In this way, over an operating range of load current, an increase of load current will result in a substantially equal decrease of current flowing into the emitter of the first transistor, thereby maintaining the load voltage substantially constant. When the load current has a minimum value which may be zero, a maximum current flows into the emitter of the first transistor. The maximum load current for which the load voltage is maintained substantially constant, is determined by the minimum current flowing into the emitter of the first transistor. A maximum operating range of load current is thus obtained if the current flowing into the emitter of the first transistor can be reduced substantially to zero. Any increase of load current beyond the value which causes the emitter current of the first transistor to be reduced to a minimum emitter current will result in a dcrease of load voltage.

At a relatively low ambient temperature, 20 degrees centigrade, for example, a reduction of the current flowing out of the base of the first transistor substantially to zero causes the current flowing into its emitter and out of its collector to be reduced nearly to zero. However, an increase of ambient temperature to 60 degrees centigrade, for example, with the base current at zero, will result in a substantially higher current flowing into the emitter and out of the collector. With the base current at zero, this increase of ambient temperature would thus result in a considerable decrease of the load current at substantially constant load voltage. To permit the emitter current of the first transistor to be reduced substantially to zero at a relatively high ambient temperature, there is provided a resistive current path for connecting the base of the first transistor and the emitter of the second transistor to the positive terminal of the rectifier. With this arrangement the base current of the first transistor will reverse when the emitter current of the second transistor is reduced sufficiently, that is, current will flow through the resistive current path into the base of the first transistor. There is also provided a resistive current path connecting the base of the second transistor and the collector of the third transistor to the positive rectifier terminal so that, when the collector current of the third transistor is reduced sufficiently, current may flow through the resistive current path into the base of the second transistor, thereby further reducing the emitter current of the second transistor. With this improvement, therefore, load voltage changes are minimized over an operating range of load current including a certain maximum load current over an increased range of ambient temperature.

Figure 2:
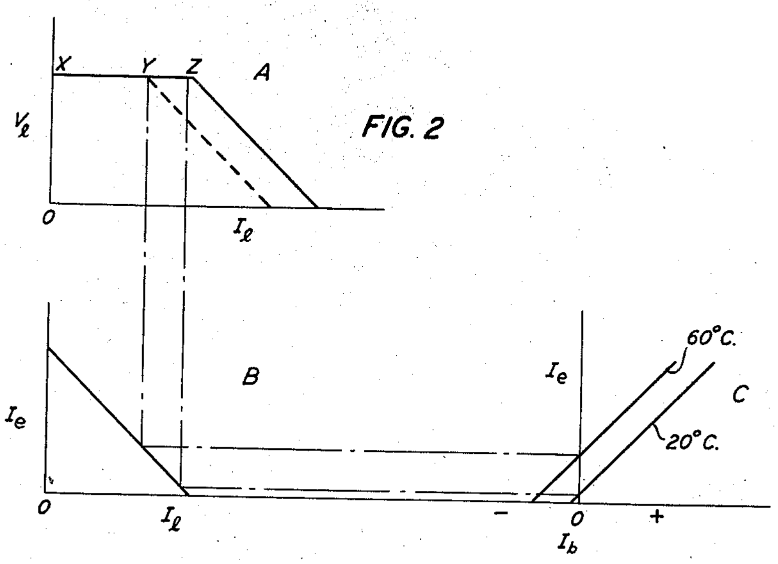

The invention will now be described in greater detail with reference to the accompanying drawing in which:

Fig. 1 is a schematic view of a current supply apparatus embodying the invention; and Fig. 2 is a diagram to which reference will be made in describing the operation of the current supply apparatus of Fig. 1.

Referring now to the drawing, there is provided a transformer having a primary winding 10 connected to a 115-volt, 60-cycle per second, alternating-current supply source 11 and having secondary windings 12 and 13. The transformer winding 12 is connected to the input terminals of a bridge rectifier 14. The positive output terminal of the rectifier 14 is connected through a series resistor 15 of 215 ohms, for example, to the positive terminal 16 of a load circuit, the negative terminal 17 of the load circuit being directly connected to the negative output terminal of the rectifier 14. The load circuit comprises a dissipative load 18 which may vary and a floating battery 19 connected across the load.

There are provided a first transistor 20 of the p-n-p type, a second transistor 21 of the p-n-p type and a third transistor 22 of the n-p-n type, each transistor having a collector, an emitter and a base. The emitter of transistor 20 is directly, conductively connected to the positive load terminal 16 and the collector of transistor 20 is connected through a 150-ohm resistor 26 to the negative load terminal 17. The base of transistor 20 is directly, conductively connected to the emitter of transistor 21. The base of transistor 20 and the emitter of transistor 21 are connected through a resistor 23 of 1470 ohms and a resistor 24 of 900 ohms, in series, to the positive output terminal of rectifier 14. A condenser 25 of 100 microfarads is provided in a path connecting the common terminal of resistors 23 and 24 and the positive load terminal. The collector of transistor 21 is connected through a resistor 27 of 1780 ohms to the negative load terminal 17.

The collector of transistor 22 is connected through resistor 28 of 3160 ohms, resistor 29 of 2610 ohms and resistor 24, all in series, to the positive output terminal of rectifier 14. The base of transistor 21 is directly, conductively connected to the common terminal of resistors 28 and 29. The emitter of transistor 22 is directly, conductively connected to the negative load terminal 17. There is connected across the load a current path comprising a resistor 30 of 760 ohms having a terminal connected to the positive load terminal, a potentiometer 31 of 100-ohm resistance, and a resistor 32 of 270 ohms, all in series. A circuit connecting the base and emitter of transistor 22 comprises in series a p-n junction diode 33, a variable portion of potentiometer 31 and the resistor 32. There is provided a 50-microfarad condenser 34 to which charging current is supplied from transformer winding 13 through a rectifying element 35, there being connected across the condenser 34 a current path comprising the diode 33 and a 1000-ohm resistor 36 in series. There is thus supplied through the diode 33 in its reverse or high resistance direction current of sufficient amplitude to cause a substantially constant unidirectional voltage to be set up across the diode. This constant reference voltage and that portion of the load voltage across resistor 32 and an adjustable portion of potentiometer 31 are opposed in the circuit connecting the emitter and the base of transistor 22.

The regulating circuit will operate to supply to the load circuit direct current which may vary over an operating range including a maximum operating current of .060 ampere, for example, while maintaining the load voltage substantially constant at 23 volts, for example, over a wide range of ambient temperatures. If the load current should increase above the normal maximum operating value, the load voltage will decrease rapidly. The maximum operating load current is reached when the emitter current of transistor 20 is reduced to zero. Any further increase of load current will cause the voltage drop across the series resistor 15 to increase and thereby reduce the voltage between terminals 16 and 17 of the load circuit.

If the load current increases, for example, the voltage drop across resistor 15 increases to cause a reduction of the load voltage. The resulting voltage reduction across resistor 32 and a portion of the resistance of potentiometer 31 makes the base of transistor 22 relatively less positive with respect to the potential of the emitter of transistor 22. The current flowing into the collector of the transistor is thus reduced and, as a result, the current flowing out of the base of transistor 21 is reduced. The current flowing into the emitter of transistor 21 is therefore reduced to cause a reduction of the current flowing out of the base of transistor 20. The decrease of current flowing out of the base of transistor 20, in turn, causes a reduction of the current flowing through resistor 15 and into the collector of transistor 20. The resulting reduction of voltage drop across resistor 15 compensates, in large part at least, for the initially assumed increase of voltage drop across resistor 15 due to the increased load current, thereby minimizing the change of load voltage.

As the load current is further increased, the current flowing into the emitter of transistor 20 is further reduced to minimize the change of load voltage. A limiting value of load current for which the load voltage is maintained substantially constant is reached when the current flowing into the emitter of transistor 20 has been reduced to zero. Any further increase of load current will cause the load voltage to decrease.

Referring to the diagram of Fig. 2, curve A shows the relationship between the load current $I_l$ and the load voltage $V_l$. Curve B shows the relationship between the load current $I_l$ and the current $I_e$ which flows into the emitter of transistor 20. Each of the two curves C shows the relationship between the base current $I_b$ of transistor 20 and the emitter current $I_e$ of the transistor 20, the one curve, designated 20° C., being for an ambient temperature of 20 degrees centigrade and the other curve, designated 60° C., being for an ambient temperature of 60 degrees centigrade. It will be noted from the diagram of Fig. 2C, that the effect of an increase of ambient temperature is to increase the emitter current of transistor 20 for a certain base current. This is also true of transistor 21. With respect to transistor 22, however, an increase of current flowing into the collector in response to an increase of ambient temperature is minimized or substantially prevented because the voltage across the p-n junction diode 33 rises in response to an increase in ambient temperature. The rise of voltage across the diode 33 in response to an increase of ambient temperature, makes the base of transistor 22 relatively more negative or less positive with respect to the emitter potential, thereby substantially preventing a rise of collector current in response to an ambient temperature increase.

It will be noted from the curves of Fig. 2, that when the ambient temperature is 20 degrees centigrade and when the base current of transistor 20 is reduced from a certain maximum value to zero, the emitter current is reduced from a certain maximum value to a value near zero. As seen in curves A and B, this change in emitter current of transistor 20 will result in a substantially constant load voltage over a wide range of load current from point $x$ to point $z$ on curve A. It will be further noted, however, that when the ambient temperature is increased to 60 degrees centigrade and when the base current of transistor 20 is zero, the emitter current is increased to a value considerably above zero and the load current range for which the load voltage is substantially constant will extend from point $x$ to point $y$ of curve A. The load current at point $y$ is considerably less than the load current at point $z$. Therefore, increasing the ambient temperature from 20 degrees centigrade to 60 degrees centigrade will result in reducing the operating load current range at substantially constant load voltage if the base current is reduced from some positive value of current flowing out of the base of transistor 20 to zero.

The full operating range of load current, $x$—$z$, may be realized at an ambient temperature of 60 degrees centigrade, however, by causing the current flowing out of the base of transistor 20 to decrease from a certain maximum value to zero and then to increase in the reverse direction to a certain value. In the diagram C, positive values of base current, $I_b$, represent current flowing out of the base of transistor 20 and negative values of the current $I_b$ represent current flowing into the base. When the current flowing into the base of transistor 20 is increased sufficiently, the emitter current of transistor 20 is reduced to zero and the load voltage is maintained substantially constant over the relatively wide operating range of load current *x—z*.

The provision of the resistive path 23, 24 connecting the positive terminal of rectifier 14 to the common terminal going to the base of transistor 20 and to the emitter of transistor 21 makes possible the reversal of the base current of transistor 20 and therefore the reduction to zero of the emitter current of transistor 20 particularly at relatively high ambient temperatures. When the emitter current of transistor 21 is relatively high, current is supplied to the emitter of transistor 21 by way of two current paths, that is, from the positive terminal of rectifier 14 through resistors 24 and 23 in series into the emitter of transistor 21 and from the positive terminal of rectifier 14 through resistor 15, into the emitter and out of the base of transistor 20 and into the emitter of transistor 21. When the emitter current of transistor 21 is reduced sufficiently, current no longer flows out of the base of transistor 20. Current then flows from the positive terminal of rectifier 14 through resistors 24 and 23, in series, and a portion of this current flows into the emitter of transistor 21 and the remainder of the current flows into the base of transistor 20. Under this condition the emitter current of transistor 20 may be zero, the current flowing into the base of transistor 20 being equal to the current flowing out of the collector of transistor 20.

In order to reduce the emitter current of transistor 21 sufficiently to permit the emitter current of transistor 20 to be reduced to zero, the base current of transistor 21 may also be reversed. This is made possible by providing a resistive path connecting both the base of transistor 21 and the collector of transistor 22 to the positive output terminal of rectifier 14. As the current flowing from the rectifier 14 through resistors 24, 29 and 28, in series, to the collector of transistor 22 decreases, the current flowing out of the base of transistor 21 first decreases to zero and then reverses so that current will flow through resistors 24 and 29 in series into the base of transistor 21. As the current flowing into the collector of transistor 22 is further reduced, the current flowing into the base of transistor 21 increases.

What is claimed is:

1. In combination, means having series resistance for supplying direct current to a load, a first and a second transistor each having an emitter, a collector and a base, a shunt current path comprising the emitter and collector of said first transistor connected across said load, means for supplying current from said supply source to the emitter-collector path of said second transistor and means responsive to load voltage changes for minimizing voltage changes across said load comprising means for reducing the current in the emitter-collector path of said second transistor in response to a decrease of load voltage resulting from an increase of load current and means for coupling the base of said first transistor to the emitter-collector path of said second transistor for reducing the base current of said first transistor from a predetermined amplitude having a certain direction to zero as the current through said load increases over a certain amplitude range and for increasing the base current of said first transistor from zero to a predetermined amplitude in the reverse direction as the current through said load increases beyond said certain amplitude range.

2. In combination, means for supplying current from a direct-current supply source through a resistive current path to a load, a plurality of transistors each having an emitter, a collector and a base, a first current path comprising the emitter and collector of a first of said transistors connected across said load, a second current path comprising resistance in series with the collector-emitter path of a second of said transistors and having end terminals connected to said current supply source to form a circuit for energizing said second current path, a third current path comprising resistance in series with the collector-emitter path of a third of said transistors and having end terminals connected to said current supply source to form a circuit for energizing said third current path, means for connecting the base of said first transistor to a point of said second current path intermediate its end terminals, means for connecting the base of said second transistor to a point of said third current path intermediate its end terminals, a p-n junction diode, means for supplying direct current to said junction diode to set up a substantially constant voltage thereacross, a voltage dividing resistance path connected across said load, and a circuit connecting the emitter and base of said third transistor comprising in series said diode and an adjustable portion of said voltage dividing resistance path.

3. In combination, a first resistor, a circuit for supplying current from a direct-current source having a positive and a negative terminal through said first resistor to a load, a first and a second transistor each of the p-n-p type, a third transistor of the n-p-n type, each of said transistors having a collector, an emitter and a base, a shunt current path comprising the emitter and collector of said first transistor connected across said load, means for connecting the collector of said first transistor to said negative terminal, means for connecting the collector of said second transistor to said negative terminal, means for conductively connecting the base of said first transistor to the emitter of said second transistor, a resistive path for connecting the base of said first transistor and the emitter of said second transistor to said positive terminal, means for connecting the emitter of said third transistor to said negative terminal, a resistive path connecting the collector of said third transistor to said positive terminal, means for connecting the base of said second transistor through a portion of said last-named resistive path to the collector of said third transistor, a p-n junction diode, a second resistor, means for supplying current through said second resistor to said diode to set up a reference voltage across said diode, a voltage dividing resistance path connected across said load and a circuit connecting the emitter and base of said third transistor comprising in series said diode and an adjustable portion of said voltage dividing resistance path.

References Cited in the file of this patent

UNITED STATES PATENTS

| | | |
|---|---|---|
| 2,301,343 | Tarr | Nov. 10, 1942 |
| 2,517,960 | Barney et al. | Aug. 8, 1950 |
| 2,531,076 | Moore | Nov. 21, 1950 |
| 2,655,609 | Shockley | Oct. 13, 1953 |
| 2,660,624 | Bergson | Nov. 24, 1953 |
| 2,693,572 | Chase | Nov. 2, 1954 |
| 2,698,416 | Sherr | Dec. 28, 1954 |
| 2,751,545 | Chase | June 19, 1956 |